3,321,423
HALOGENATED POLYOLEFIN COMPOSITIONS STABILIZED WITH (A) HYDROLYZED MIXTURES OF A BARIUM ALKYLPHENOL, A CADMIUM MONOCARBOXYLATE AND AN ORGANIC PHOSPHITE AND (B) A POLYHYDRIC ALCOHOL
James P. Scullin, Pompton Lakes, and Arthur F. Fletcher, Elizabeth, N.J., assignors, by mesne assignments, to Tenneco Chemicals, Inc., a corporation of Delaware
No Drawing. Filed Aug. 1, 1962, Ser. No. 213,850
4 Claims. (Cl. 260—23)

This invention relates to the stabilization of halogenated polyolefins. More particularly, it relates to halogenated polyolefin compositions that are stabilized against degradation under conditions of elevated temperatures and/or mechanical working.

It is known that halogenated polyolefins undergo appreciable darkening when heated during thermal fabrication operations and when the fabricated articles are exposed to elevated temperatures for prolonged periods. This thermal sensitivity has seriously limited the applications in which the halogenated polyolefins may be employed.

Stabilizers that have been used to impart thermal stability to polyvinyl halide resins have been suggested for use in the stabilization of halogenated polyolefins against decomposition and degradation resulting from exposure to heat and light. These materials, however, have been found in most cases to be unsatisfactory as stabilizers for halogenated polyolefin compositions because they impart color to the compositions or because they fail to provide the required heat stability.

It is an object of this invention to provide stabilized halogenated polyolefin compositions. More particularly it is an object to stabilize halogenated polyolefins against the deteriorating effects of high temperatures. It is a further object to provide halogenated polyolefin compositions which are satisfactorily stabilized and which may be molded, extruded, or otherwise fabricated to form flexible, thermally stable products. Other objects of the invention will be apparent from the description that follows.

The above objects are accomplished in accordance with the present invention by incorporating in a halogenated polyolefin composition a heat stabilizing amount of a stabilizer which comprises a polyhydric alcohol and an organic phosphite. In most cases approximately 1% to 10% and preferably 1.5% to 5% of the stabilizer based on the weight of the halogenated polyolefin will impart heat stability to the resinous composition. The stabilizer of the present invention is compatible with halogenated polyolefins and generally with the compounding ingredients used with these polymers, and it serves to protect the compositions from thermal degradation both during and subsequent to their fabrication.

The polymers to which this invention applies are the halogenated homopolymers and copolymers of olefins having from 2 to 6 carbon atoms per molecule, such as ethylene, propylene, 1-butene, 1-pentene, and 1-hexene. While these polymers are ordinarily and preferably chlorinated, they may also be brominated, iodinated, or fluorinated. The halogenated polyolefins treated according to this invention generally contain between 5% and 80% by weight of halogen. The novel stabilizers are particularly useful in chlorinated polyethylene compositions derived from normally solid polyethylene and having a chlorine content between approximately 20% and 70%. Processes for the production of these halogenated polyolefins are disclosed in Fawcett, U.S. Patent No. 2,183,556 and Hogan and Banks, U.S. Patent No. 2,825,721.

The polyhydric alcohols that may be used in the practice of this invention are those that contain at least two hydroxyl groups. These include, for example, ethylene glycol, propylene glycol, neopentyl glycol, glycerol, trimethylolethane, trimethylolpropane, trimethylolbutane, butanetriol-1,2,3, hexanetriol, pentaerythritol, dipentaerythritol, tripentaerythritol, erythritol, sorbitol, mannitol, inositol, 1,4-dimethylolbenzene, and dimethyloltoluenes as well as the polymeric polyhydric alcohols, such as hydroxyethylcellulose. Also useful is the polymeric alcohol that has the formula

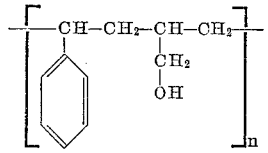

This material, which contains an average of 5.2 hydroxyl groups per mole and which has a molecular weight of approximately 1150, is marketed as Resinous Polyol X–450 by Shell Chemical Co. The preferred polyhydric alcohols for use in the novel stabilizers are neopentyl polyhydric alcohols that contain from 2 to 8 hydroxyl groups, for example, neopentyl glycol, trimethylolethane, trimethylolpropane, trimethylolbutane, pentaerythritol, dipentaerythritol, and tripentaerythritol. A single polyhydric alcohol or a mixture of two or more of these alcohols may be used. When a solid polyhydric alcohol, such as pentaerythirtol, is used, it is preferably added to the halogenated polyolefin composition as a finely-divided powder.

The organic phosphites that may be used in the stabilizer mixtures include a wide variety of substituted and unsubstituted aliphatic and aromatic phosphites. They may be secondary phosphites, such as diaryl phosphites, aryl alkyl phosphites, and dialkyl phosphites, or tertiary phosphites, such as trialkyl phosphites, triaryl phosphites, dialkyl monoaryl phosphites, and monoalkyl diaryl phosphites. Also useful are cyclic phosphites derived from pentaerythritol and other neopentyl polyhydric alcohols. A preferred group of phosphites are the trialkyl, triaryl, dialkyl monoaryl phosphites, and monoalkyl diaryl phosphites in which the alkyl groups are straight-chain or branched-chain groups containing from 3 to 18 carbon atoms and preferably from 4 to 10 carbon atoms and the aryl groups are phenyl groups or substituted phenyl groups in which the substituents are halogen atoms, hydroxyl groups, or alkyl groups containing from 1 to 12 carbon atoms. Illustrative of these organic phosphites are the following: triphenyl phosphite, tri-(p-tert. butylphenyl) phosphite, tri-(hydroxyphenyl) phosphite, diphenyl monobutyl phosphite, diphenyl monododecyl phosphite, monophenyl di-2-ethylhexyl phosphite, di-(p-tert. octylphenyl) mono-(2-ethylhexyl) phosphite, di-(nonylphenyl) mono-(2-chloroethyl) phosphite, mono (chlorophenyl) di (β-chlorobutyl) phosphite, tripropyl phosphite, trioctyl phosphite, tridodecyl phosphite, trioctadecyl phosphite, dioctadecyl monopropyl phosphite, dibutyl monododecyl phosphite, and the like. Another preferred group of phosphites are the secondary phosphites that contain the aforementioned aryl and/or alkyl groups. These include, for example, diphenyl phosphite, di (chlorophenyl) phosphite, octaphenyl octyl phosphite, di (nonylphenyl) phosphite, di (dibutylphenyl) phosphite, phenyl octadecyl phosphite, dibutylphenyl dodecyl phosphite, dibutyl phosphite, di-2-ethylhexyl phosphite, and hexyl octyl phosphite. Also preferred are secondary phosphites resulting from the partial hydrolysis of any of the aforementioned tertiary phosphites. A single phosphite or a mixture of two or more of these compounds may be used in the halogenated polyolefin compositions.

For most applications the stabilizer will comprise approximately 0.2 part to 5 parts and preferably 0.8 part to 3 parts by weight of the polyhydric alcohol per part by weight of the organic phosphite.

In addition to the organic phosphite and the polyhydric alcohol, the stabilizer may also contain polyvalent metal salts. These salts improve the heat stability of the halogenated polyolefin compositions somewhat and tend to inhibit the cross-linking that often takes place during the working of the resin. The useful salts include alkaline earth metal salts of phenols having as substituents one or more alkyl groups each of which contains 4 to 12 carbon atoms, for example, the barium, strontium, and calcium salts of tert. butylphenol, dibutylphenol, n-octylphenol, dodecylphenol, dinonylphenol, and didecylphenol. Also useful are polyvalent metal salts of alkanoic acids containing from 2 to 22 carbon atoms and benzenoid monocarboxylic acids, for example, the cadmium, tin, and zirconium salts of butyric acid, hexanoic acid, 2-ethylhexanoic acid, caprylic acid, pelargonic acid, lauric acid, stearic acid, benzoic acid, tert. butylbenzoic acid, toluic acids, chlorobenzoic acids, and hydroxybenzoic acids. While a single polyvalent metal salt may be present in the novel stabilizers, it is generally preferred that both a barium alkylphenate and a cadmium salt of either an alkanoic acid or a benzenoid monocarboxylic acid be present in the stabilizers. When the aforementioned metal salts are used as stabilizer components, the stabilizer mixture generally contains approximately 0.2 part to 5 parts by weight of the polyhydric alcohol, 0.3 part to 0.6 part by weight of the alkaline earth metal alkylphenate, and 0.1 part to 0.4 part by weight of the polyvalent metal salt of a monocarboxylic acid per part by weight of the organic phosphite.

The stabilizer components may be added individually to the halogenated polyolefin composition or a mixture of the components may be added. When the barium and cadmium salts are used, they are preferably added in combination with the organic phosphite as a mixture that comprises approximately 5%–7% by weight of barium as the barium alkylphenate, 3%–5% by weight of cadmium as the cadmium salt, and 1%–3% of phosphorus as an organic phosphite, the remainder of the mixture being solvents, viscosity controlling agents, and the like. If desired, this mixture may be combined with the polyhydric alcohol prior to its addition to the halogenated polyolefin composition.

In a preferred embodiment of the invention, the stabilizer mixture comprises a polyhydric alcohol and a hydrolyzed product comprising a barium alkylphenate, a cadmium salt, and an organic phosphite in the amounts of approximately 0.3 part to 3 parts by weight of the polyhydric alcohol per part by weight of the hydrolyzed product. The hydrolyzed product may be prepared by treating a mixture comprising approximately 20% to 30% by weight of a barium alkylphenate, 5% to 20% by weight of a cadmium salt of a monocarboxylic acid, and 50% to 60% by weight of an organic phosphite at a temperature between approximately 110° F. and 190° F. with approximately 0.2% to 1% based on the weight of the mixture of water. A process by which the mixture of stabilizer components may be hydrolyzed and the properties of the resulting products are described in detail in copending patent application Ser. No. 134,082, which was filted by James P. Scullin and Theodore A. Girard on Aug. 28, 1961, now U.S. Patent 3,202,622 issued Aug. 24, 1965.

The stabilizer may be incorporated in the halogenated polyolefin composition by any convenient procedure. For example, the halogenated polyolefin may be mixed with a polyhydric alcohol, an organic phosphite, a plasticizer, and other ingredients, if any, with or without the aid of a volatile solvent, and the resulting mixture milled on rolls at 200° F. to 350° F. until it is homogeneous. The stabilized resin may then be removed from the mill in the form of a sheet or film of the desired thickness which may be used as such or subjected to polishing or embossing treatment. Alternatively, the stabilizer components may be incorporated by dissolving them in a solution of the resin. This solution may then be used as such, for example, as a varnish for coating or spraying on various materials or for casting articles in a mold. Stabilized halogenated polyolefins may also be obtained by removing the solvent from such a solution by evaporation or steam distillation.

The stabilized compositions of the present invention may contain any of the plasticizers that are ordinarily employed in halogenated polyolefin compositions. These include, for example, dioctyl phthalate, dibutyl sebacate, and tricresyl phosphate. The plasticizer is generally present in the amount of approximately 5 to 100 parts by weight per 100 parts by weight of the polymer. Other heat and light stabilizers as well as pigments, fillers, extenders, solvents, and the like may also be present in the stabilized resinous compositions.

The present invention is further illustrated by the examples that follow. It is to be understood, however, that these examples are given solely for the purpose of illustration and that the invention is not to be regarded as being limited to any of the specific materials or conditions recited therein except as set forth in the appended claims.

*Example 1*

Resinous compositions containing the stabilizers of this invention were prepared by milling a base formulation and the stabilizer components together for 5 minutes on a 2-roll differential speed mill at 330° F. The stabilized composition was then removed from the rolls as a flexible homogeneous sheet, 0.025 inch in thickness. The heat stability of the compositions was determined by placing 1 x 1 inch specimens which had been cut from the milled sheets in a forced-circulation air oven at 350° F. and removing specimens periodically until degradation was complete as indicated by color change. The specimens were then rated using the following color code:

C—Colorless
LY—Light Yellow
Y—Yellow
LT—Light Tan
T—Tan
L Br—Light Brown
Br—Brown
Bl—Black The base formulation used in the preparation of the stabilized resinous compositions consisted of 100 parts by weight of chlorinated polyethylene (chlorine content, 56%), 45 parts by weight of di (2-ethylhexyl) phthalate, and 5 parts by weight of epoxidized soybean oil. The stabilizer components used and the results of the heat stability tests are shown in Table I.

TABLE I

| Ex. No. | Stabilizer Components | PHR[1] | Color After Indicated Number of Minutes at 350° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| 1A | Pentek Powder[2] / Triphenyl phosphite | 1 / 1 | C | C | LY | LY | LY | Y | Y | LT | LT | T | T |
| 1B | Pentek Powder / Triphenyl phosphite | 3 / 1 | C | C | LY | LY | LY | LY | Y | LT | LT | L Br | Br |
| 1C | Pentek Powder / Triphenyl phosphite | 3 / 2 | C | C | LY | LY | LY | LY | LY | Y | Y | Y | LT |
| 1D | Pentek Powder / Diphenyl phosphite | 1 / 0.75 | C | C | LY | LY | LY | LY | Y | Y | LT | LT | T |
| 1E | Pentek Powder / Diphenyl monodecyl phosphite | 1 / 1.2 | C | C | LY | LY | Y | Y | Y | LT | LT | T | T |
| 1F | Pentek Powder / Monophenyl monodecyl phosphite | 1 / 1 | C | C | LY | LY | LY | LY | Y | Y | LT | LT | T |
| 1G | Pentek Powder / Tridecyl phosphite | 1 / 1.7 | C | C | LY | LY | Y | Y | LT | LT | LT | T | L Br |
| 1H | Sorbitol / Triphenyl phosphite | 3 / 2 | C | C | LY | LY | LY | LY | Y | Y | Y | Y | LT |
| 1I | Sorbitol / Diphenyl phosphite | 3 / 2 | C | C | LY | LY | LY | LY | Y | Y | LT | LT | T |
| 1J | Sorbitol / Diphenyl monodecyl phosphite | 3 / 2 | C | C | LY | LY | LY | LY | Y | Y | Y | LT | LT |
| 1K | Sorbitol / Tridecyl phosphite | 3 / 2 | C | C | LY | LY | LY | LY | LY | Y | LT | LT | LT |
| 1L | Trimethylolethane / Triphenyl phosphite | 3 / 2 | C | C | LY | LY | Y | Y | Y | LT | LT | T | T |
| 1M | Trimethylolethane / Diphenyl phosphite | 3 / 2 | C | C | LY | LY | LY | Y | Y | LT | LT | T | T |
| 1N | Trimethylolethane / Diphenyl monodecyl phosphite | 3 / 2 | C | C | LY | LY | LY | Y | Y | LT | LT | T | T |
| 1O | Trimethylolethane / Tridecyl phosphite | 3 / 2 | C | C | LY | LY | LY | LY | Y | LT | LT | T | T |
| 1P | Neopentyl glycol / Triphenyl phosphite | 3 / 2 | C | C | LY | LY | Y | Y | Y | LT | LT | T | L B |
| 1Q | Neopentyl glycol / Didecyl monophenyl phosphite | 3 / 2 | C | C | LY | LY | LY | Y | LT | LT | T | L Br | L Br |
| 1R | Neopentyl glycol / Tridecyl phosphite | 3 / 2 | C | C | LY | LY | LY | LY | Y | LT | T | L Br | L Br |
| 1S | Resinous Polyol X-450 / Triphenyl phosphite | 3 / 2 | C | LY | LY | Y | Y | LT | LT | LT | T | L Br | L Br |
| 1T | Resinous Polyol X-450 / Diphenyl decyl phosphite | 3 / 2 | C | LY | LY | LY | Y | LT | LT | T | T | L Br | L Br |
| 1U | Resinous Polyol X-450 / Tridecyl Phosphite | 3 / 2 | C | LY | LY | LY | Y | LT | LT | T | T | L Br | L Br |
| 1V | No stabilizer | | Y | T | T | Br | Br | Bl | | | | | |

[1] Parts by weight of stabilizer per 100 parts by weight of chlorinated polyethylene.
[2] Technical grade of pentaerythritol marketed by Heyden Newport Chemical Corporation.

Example 2

A series of chlorinated polyethylene compositions was prepared in which the stabilizer mixture consisted of powdered technical pentaerythritol (Pentek) and an organic phosphite. The base formulation and the method by which the compositions were prepared were the same as those described in Example 1. The amounts of the stabilizer components used and the results of the heat stability tests at 375° F. are given in Table II.

Example 3

A series of chlorinated polyethylene compositions was prepared in which the stabilizer mixture consisted of a polyhydric alcohol and a metal salt-phosphite mixture. This metal salt-phosphite mixture comprised approximately 5.6% by weight of barium as barium nonylphenate, 3.6% by weight of cadmium as cadmium 2-ethylhexoate, and 30% by weight of diphenyl monodecyl phosphite in a hydrocarbon solvent. The base formulation and the

TABLE II

| Ex. No. | Stabilizer Component | PHR | Color after indicated number of minutes at 375° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| 2A | Pentek Powder / Triphenyl phosphite | 1 / 1 | C | LY | LT | T | T | L Br | Br | Br | Br | Br | Br |
| 2B | Pentek Powder / Diphenyl phosphite | 1 / 0.75 | C | LY | LT | T | T | L Br | Br | Br | Br | Br | Br |
| 2C | Pentek Powder / Diphenyl phosphite | 1 / 1.2 | C | LY | LT | T | T | L Br | Br | Br | Br | Br | Bl |
| 2D | Pentek Powder / Phenyl decyl phosphite | 1 / 1 | C | LY | T | T | T | L Br | Br | Br | Br | Br | Bl |
| 2E | Pentek Powder / Tridecyl phosphite | 1 / 1.7 | C | LY | T | T | T | Br | Br | Br | Br | Br | Bl |
| 2F | Pentek Powder | 1 | C | Y | T | Br | Br | Bl | | | | | | method by which the compositions were prepared were the same as those described in Example 1. The amounts of the stabilizer components used and the results of the heat stability tests are given in Table III.

150°–160° F. with 1 part by weight of water for 90 minutes.

The base formulation and the method by which the compositions were prepared were the same as those de-

TABLE III

| Ex. No. | Stabilizer Component | PHR | Color After Indicated Number of Minutes at 350° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| 3A | Pentek Powder / Metal salt-phosphite mixture | 1 / 3 | LY | LY | Y | Y | Y | LT | LT | T | T | Br | Br |
| 3B | Pentek Powder / Metal salt-phosphite mixture | 3 / 1 | C | LY | LY | Y | Y | LT | LT | LT | T | T | T |
| 3C | Sorbitol / Metal salt-phosphite mixture | 3 / 1 | C | LY | LY | Y | Y | LT | LT | LT | T | T | T |
| 3D | Neopentyl glycol / Metal salt-phosphite mixture | 3 / 1 | C | LY | Y | Y | LT | LT | LT | LT | T | T | L Br |
| 3E | Metal salt-phosphite mixture | 3 | LT | LT | T | T | T | L Br | L Br | Br | Br | Br | Bl |
| 3F | Pentek Powder | 3 | C | C | LY | LY | Y | Y | LT | T | L Br | Br | Br |

*Example 4*

A series of chlorinated polyethylene compositions was prepared in which the stabilizer was a combination of a polyhydric alcohol and a hydrolyzed mixture of stabilizer components. The hydrolyzed product was prepared by treating a mixture comprising approximately 13 parts by weight by barium nonylphenate, 3.5 parts by weight of cadmium benzoate, 3.5 parts by weight of cadmium p-tert. butylbenzoate, 30 parts by weight of diphenyl mono-n-decyl phosphite, and 50 parts by weight of a solvent at scribed in Example 1. The stabilizer components used and the results of the heat stability tests are given in Table IV.

TABLE IV

| Ex. No. | Stabilizer Component | PHR | Color After Indicated Number of Minutes at 350° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| 4A | Pentek Powder / Hydrolyzed Product | 3 / 1 | C | LY | LY | Y | Y | Y | Y | LT | LT | T | T |
| 4B | Pentek Powder / Hydrolyzed Product | 1 / 3 | LY | LY | LY | Y | Y | Y | LT | LT | T | T | L Br |
| 4C | Pentek Powder / Hydrolyzed Product | 1.5 / 1.5 | LY | LY | LY | Y | Y | Y | Y | LT | LT | T | T |
| 4D | Sorbitol / Hydrolyzed Product | 3 / 1 | C | LY | LY | Y | Y | Y | Y | LT | LT | T | T |
| 4E | Neopentyl glycol / Hydrolyzed Product | 3 / 1 | C | LY | LY | Y | Y | Y | LT | T | T | L Br | L Br |
| 4F | Hydrolyzed Product | 3 | LY | Y | Y | Y | LT | LT | LT | T | T | T | L Br |
| 4G | do | 4 | LY | Y | Y | Y | LT | LT | LT | T | T | T | T |

*Example 5*

A series of chlorinated polyolefin compositions was prepared in which the stabilizer was a combination of powdered technical pentaerythritol (Pentek) and the hydrolyzed product whose preparation was described in Example 4.

The base formulation and the method by which the compositions were prepared were the same as those described in Example 1. The amounts of the stabilizer components used and the results of the heat stability tests at 400° F. are given in Table V.

TABLE V

| Ex. No. | Stabilizer Component | PHR | Color after indicated number of minutes at 400° F. | | | | | | | |
|---|---|---|---|---|---|---|---|---|---|---|
| | | | 0 | 10 | 20 | 30 | 40 | 50 | 60 | 70 |
| 5A | Pentek Powder / Hydrolyzed Product | 3 / 1 | C | LY | Y | LT | T | T | Br | Br |
| 5B | Pentek Powder / Hydrolyzed Product | 2.25 / 0.75 | C | LY | Y | LT | T | T | Br | Br |
| 5C | Pentek Powder / Hydrolyzed Product | 1.5 / 0.5 | C | LY | Y | T | L Br | Br | Br | Br |
| 5D | Pentek Powder | 3 | C | LY | Y | L Br | Br | Br | Br | Bl |

Example 6

A series of chlorinated polyolefin compositions was prepared in which the stabilizer was a combination of powdered technical pentaerythritol (Pentek) and the hydrolyzed product whose preparation was described in Example 4.

The base formulation used in the preparation of these compositions consisted of 100 parts by weight of chlorinated polyethylene (chlorine content, 56%) and 50 parts by weight of di (2-ethylhexyl) phthalate. The amounts of the stabilizer components used and the results of the heat stability tests at 400° F. are given in Table VI.

TABLE VI

| Ex. No. | Stabilizer Component | PHR | Color after indicated number of minutes at 400° F. | | | | | | | |
|---|---|---|---|---|---|---|---|---|---|---|
| | | | 0 | 10 | 20 | 30 | 40 | 50 | 60 | 70 |
| 6A | Pentek Powder / Hydrolyzed Product | 3 / 1 | C | LY | LT | L Br | L Br | L Br | Br | Br |
| 6B | Pentek Powder / Hydrolyzed Product | 2.25 / 0.75 | C | LY | LT | L Br | L Br | Br | Br | Bl |
| 6C | Pentek Powder / Hydrolyzed Product | 1.5 / 0.5 | C | Y | L Br | Br | Br | Br | Bl | |
| 6D | Pentek Powder | 3 | C | LY | LT | Br | Br | Bl | | |
| 6E | None | | LY | T | Br | Bl | | | | |

Comparative examples

For comparative purposes, a series of chlorinated polyethylene compositions was prepared in which the stabilizer was either a polyhydric alcohol or an organic phosphite. The base formulation and the method by which the compositions were prepared were the same as those described in Example 1. The results of these comparative examples are given in Table VII.

TABLE VII

| Comp. Ex. No. | Stabilizer | PHR | Color After Indicated Number of Minutes at 350° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| A | Pentek Powder | 1 | C | C | LY | Y | LT | T | T | L Br | Br | Br | Br. |
| B | do | 3 | C | C | LY | LY | Y | Y | LT | T | L Br | Br | Br |
| C | do | 5 | C | C | LY | LY | LY | Y | LT | T | L Br | Br | Br |
| D | Sorbitol | 1 | C | C | LY | LY | Y | Y | LT | T | L Br | Br | Br |
| E | do | 3 | C | C | LY | LY | LY | Y | LT | T | L Br | Br | Br |
| F | do | 5 | C | C | LY | LY | LY | Y | LT | T | L Br | Br | Br |
| G | Trimethylolethane | 1 | C | LY | Y | Y | Y | Y | LT | T | L Br | Br | Br |
| H | do | 3 | C | LY | LY | Y | Y | Y | LT | T | L Br | Br | Br |
| I | do | 5 | C | LY | LY | Y | Y | Y | LT | T | L Br | Br | Br |
| J | Neopentyl glycol | 1 | C | LY | Y | Y | LT | T | T | T | L Br | Br | Br |
| K | do | 3 | C | LY | Y | Y | Y | Y | LT | T | T | L Br | Br |
| L | do | 5 | C | LY | Y | Y | Y | Y | LT | T | T | L Br | Br |
| M | Triphenyl phosphite | 1 | C | LT | LT | LT | T | T | T | T | L Br | Br | Br |
| N | do | 3 | LY | LY | Y | Y | Y | Y | Y | LT | LT | L Br | Br |
| O | do | 5 | LY | LY | Y | Y | Y | Y | Y | Y | LT | L Br | Br |
| P | Diphenyl phosphite | 3 | LY | LY | Y | Y | Y | Y | Y | LT | LT | LY | L Br | Br |
| Q | do | 5 | LY | LY | Y | Y | Y | Y | Y | Y | LT | LT | L Br | Br |
| R | Didecyl monophenyl phosphite | 3 | LY | LY | Y | Y | Y | Y | Y | LT | LT | LT | Br | Br |
| S | do | 5 | LY | LY | Y | Y | Y | Y | Y | Y | LT | LT | L Br | Br |
| T | Tridecyl phosphite | 3 | LY | LY | Y | Y | Y | Y | Y | LT | LT | L Br | L Br | Br |
| U | do | 5 | LY | LY | Y | Y | Y | Y | Y | LT | LT | L Br | L Br | Br |
| V | Didecyl phosphite | 3 | LY | LY | Y | Y | Y | Y | Y | LT | LT | LT | Br | Br |
| W | do | 5 | LY | LY | Y | Y | Y | Y | Y | LT | LT | LT | L Br | Br |
| X | Resinous Polyol X-45 | 3 | C | Y | Y | Y | LT | LT | LT | T | L Br | L Br | Br | Br |
| Y | do | 5 | C | Y | Y | Y | LT | LT | LT | T | L Br | L Br | Br | Br |

The foregoing examples have illustrated the manner in which the novel stabilizers may be combined with a halogenated polyolefin to form compositions that may be used in the preparation of calendered sheets and films. In addition these stabilizers may be used with chlorinated polyethylene or other halogenated polyolefins in plastisol, organosol, extrusion, injection molding, and solvent formulations to form products that are characterized by good color and clarity and excellent heat stability.

What is claimed is:

1. A thermally stabilized resinous composition comprising chlorinated polyethylene containing approximately 20% to 70% by weight of chlorine and approximately 1.5% to 5% based on the weight of said chlorinated polyethylene of a stabilizer, said stabilizer comprising (a) a polyhydric alcohol and (b) the hydrolyzed product that is obtained by forming a mixture comprising approximately 20% to 30% by weight of a barium alkylphenate, 5% to 20% by weight of a cadmium salt of a monocarboxylic acid selected from the group consisting of alkanoic acids containing from 4 to 18 carbon atoms and benzoic acid, alkylbenzoic acids, chlorobenzoic acids, and hydroxybenzoic acids, and 50% to 60% by weight of an organic phosphite selected from the group consisting of secondary and tertiary alkyl, aryl, and alkyl aryl phosphites and treating said mixture at a temperature between approximately 110° F. to 190° F. with approximately 0.2% to 1% based on the weight of said mixture of water, said stabilizer mixture containing approximately 0.3 part to 3 parts by weight of said polyhydric alcohol per part by weight of said hydrolyzed product.

2. The composition of claim 1 wherein the polyhydric alcohol is pentaerythritol.

3. The composition of claim 1 wherein the polyhydric alcohol is sorbitol.

4. The composition of claim 1 wherein the organic phosphite is diphenyl mono-n-decyl phosphite.

References Cited by the Examiner

UNITED STATES PATENTS

| | | | |
|---|---|---|---|
| 2,847,443 | 8/1958 | Hechenbleiker et al. | 260—45.7 |
| 2,935,491 | 5/1960 | Mack | 260—45.7 |
| 2,938,877 | 5/1960 | Mack | 260—45.75 |
| 3,003,998 | 10/1961 | Kauder et al. | 260—45.75 |
| 3,133,043 | 5/1964 | Rosenfelder et al. | 260—45.7 |

LEON J. BERCOVITZ, *Primary Examiner.*

G. W. RAUCHFUSS, *Assistant Examiner.*